(12) United States Patent
Yang et al.

(10) Patent No.: US 11,376,567 B2
(45) Date of Patent: Jul. 5, 2022

(54) METHODS FOR PREPARING CATALYTIC SYSTEMS

(71) Applicant: GM GLOBAL TECHNOLOGY OPERATIONS LLC, Detroit, MI (US)

(72) Inventors: Ming Yang, Novi, MI (US); Se H. Oh, Troy, MI (US); Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 16/704,092

(22) Filed: Dec. 5, 2019

(65) Prior Publication Data

US 2021/0170368 A1 Jun. 10, 2021

(51) Int. Cl.

| *B01J 21/04* | (2006.01) |
|---|---|
| *B01J 23/10* | (2006.01) |
| *B01J 23/46* | (2006.01) |
| *B01J 23/63* | (2006.01) |
| *B01J 23/72* | (2006.01) |
| *B01J 23/83* | (2006.01) |
| *B01J 35/10* | (2006.01) |
| *B01J 37/02* | (2006.01) |
| *B01J 37/03* | (2006.01) |

(Continued)

(52) U.S. Cl.
CPC ............ *B01J 23/63* (2013.01); *B01D 53/945* (2013.01); *B01J 21/04* (2013.01); *B01J 23/10* (2013.01); *B01J 23/464* (2013.01); *B01J 23/72* (2013.01); *B01J 23/83* (2013.01); *B01J 35/1014* (2013.01); *B01J 37/0207* (2013.01); *B01J 37/035* (2013.01); *B01J 37/105* (2013.01)

(58) Field of Classification Search
CPC . B01J 21/04; B01J 23/10; B01J 23/464; B01J 23/63; B01J 23/72; B01J 23/83; B01J 35/1014; B01J 37/0207; B01J 37/035; B01J 37/105

See application file for complete search history.

(56) References Cited

U.S. PATENT DOCUMENTS

| 6,740,621 B2 * | 5/2004 | Singleton ............. B01J 23/8913 502/429 |
| 6,927,190 B2 * | 8/2005 | Lok .......................... B01J 23/75 502/327 |

(Continued)

*Primary Examiner* — Cam N. Nguyen
(74) *Attorney, Agent, or Firm* — Quinn IP Law (57) ABSTRACT

Methods for preparing catalytic systems include passivating a gamma-phase alumina support body to yield a theta-phase alumina support body and applying catalytic metal to passivated theta-phase alumina support body. Passivating can include heating, optionally in the presence of steam. The gamma-phase alumina can be lanthanum-doped gamma-phase alumina and can be about 0.1-55 wt. % lanthanum. The catalytic metal can include rhodium, copper, or nickel. The catalytic metal can be rhodium or nickel, and the catalytic metal can be applied to the passivated theta-phase alumina support body at a loading of about 0.1-10 wt. %. The catalytic metal can be copper, and the catalytic metal can be applied to the passivated theta-phase alumina support body at a loading of about 0.1-30 wt. %. The gamma-phase alumina support body can be at least about 90 wt. % gamma-phase alumina. The passivated theta-phase alumina support body can be at least about 80 wt. % theta-phase alumina.

19 Claims, 6 Drawing Sheets

(51) Int. Cl.
*B01J 37/10* (2006.01)
*B01D 53/94* (2006.01)

(56) References Cited

U.S. PATENT DOCUMENTS

| | | | | |
|---|---|---|---|---|
| 7,348,463 B2* | 3/2008 | Ryu | ............... | B01J 23/755 |
| | | | | 585/270 |
| 7,368,625 B2* | 5/2008 | Lok | ............... | B01J 23/75 |
| | | | | 585/733 |
| 7,501,378 B2* | 3/2009 | Lok | ............... | B01J 23/75 |
| | | | | 502/327 |
| 7,655,593 B2* | 2/2010 | Lok | ............... | B01J 37/031 |
| | | | | 502/176 |
| 8,536,236 B2* | 9/2013 | Lok | ............... | C10G 2/332 |
| | | | | 518/715 |
| 9,346,038 B2* | 5/2016 | Combes | ............... | B01J 23/8946 |
| 2003/0119668 A1* | 6/2003 | Lok | ............... | C07C 209/36 |
| | | | | 502/332 |
| 2004/0167234 A1* | 8/2004 | Abazajian | ............... | C10G 69/14 |
| | | | | 518/726 |
| 2008/0139383 A1* | 6/2008 | Ryu | ............... | B01J 35/10 |
| | | | | 502/327 |
| 2017/0137285 A1* | 5/2017 | Ide | ............... | B01J 35/04 |

* cited by examiner

METHODS FOR PREPARING CATALYTIC SYSTEMS

INTRODUCTION

Catalysts based on platinum group metals (PGMs), particularly platinum, palladium, and rhodium, and other base metal promotors (e.g., cerium, lanthanum, nickel) are commonly used in gasoline and diesel automotive emissions aftertreatment systems to convert (e.g., oxidize) various constituents of exhaust gas, such as carbon monoxide (CO), unburned and partially-burned hydrocarbons (HC), and nitrogen monoxide (NO). Such catalysts typically comprise a system of one or more metals or metal alloys disposed on a substrate (e.g., an alumina substrate). Catalyst substrates with high surface areas (e.g., gamma-phase alumina) considered to be desirable substrates. Maintaining suitable catalytic activity over the lifetime of a catalytic system remains a challenge.

SUMMARY

Methods for preparing catalytic systems are provided and include providing a gamma-phase alumina support body, passivating the gamma-phase alumina support body to yield a theta-phase alumina support body, and applying catalytic metal to passivated theta-phase alumina support body. Passivating can include heating the gamma-phase alumina support body to a temperature of about 700° C. to about 1,200° C. The gamma-phase alumina support body can be heated in the presence of steam. Passivating can include heating the gamma-phase alumina support body from about 700° C. to about 1,200° C. with a ramping rate of less than about 10° C./minute. Passivating can include heating the gamma-phase alumina support body within a temperature range of about 700° C. to about 1,200° C. for at least about 7.5 hours. The gamma-phase alumina support body can be lanthanum-doped gamma-phase alumina. The gamma-phase alumina support body can be about 0.1 wt. % to about 55 wt. % lanthanum. Passivating can include heating the lanthanum-doped gamma-phase alumina support body to a temperature of about 800° C. to about 1,300° C. The catalytic metal can be applied to the passivated theta-phase alumina support body via impregnation. The catalytic metal can be applied to the passivated theta-phase alumina support body via precipitation. The catalytic metal can include rhodium, copper, or nickel. The catalytic metal can be rhodium or nickel, and the catalytic metal can be applied to the passivated theta-phase alumina support body at a loading of about 0.1 wt. % to about 10 wt. %. The catalytic metal can be copper, and the catalytic metal can be applied to the passivated theta-phase alumina support body at a loading of about 0.1 wt. % to about 30 wt. %. The gamma-phase alumina support body can be at least about 90 wt. % gamma-phase alumina. The passivated theta-phase alumina support body can be at least about 80 wt. % theta-phase alumina.

Methods for preparing three-way catalytic systems are provided and include providing a gamma-phase alumina support body, passivating the gamma-phase alumina support body to yield a theta-phase alumina support body, applying catalytic metal to passivated theta-phase alumina support body to form a catalytic body, and disposing the catalytic body within a shell having an inlet and an outlet. The gamma-phase alumina support body can be at least about 90 wt. % gamma-phase alumina and the passivated theta-phase alumina support body can be at least about 80 wt. % theta-phase alumina. The catalytic metal can be rhodium or nickel, and the catalytic metal can be applied to the passivated theta-phase alumina support body at a loading of about 0.1 wt. % to about 10 wt. %. The catalytic metal can be copper, and the catalytic metal can be applied to the passivated theta-phase alumina support body at a loading of about 0.1 wt. % to about 30 wt. %. The gamma-phase alumina support body can include lanthanum-doped gamma-phase alumina, and the gamma-phase alumina support body can be about 0.1 wt. % to about 55 wt. % lanthanum.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are catalyst systems and appurtenant devices which maintain high catalytic activity and efficient usage of catalytic metals. The catalyst systems utilize lower surface area catalyst supports to achieve enhanced catalytic activity and reduced catalyst deactivation over prolonged use.

Figure 1:
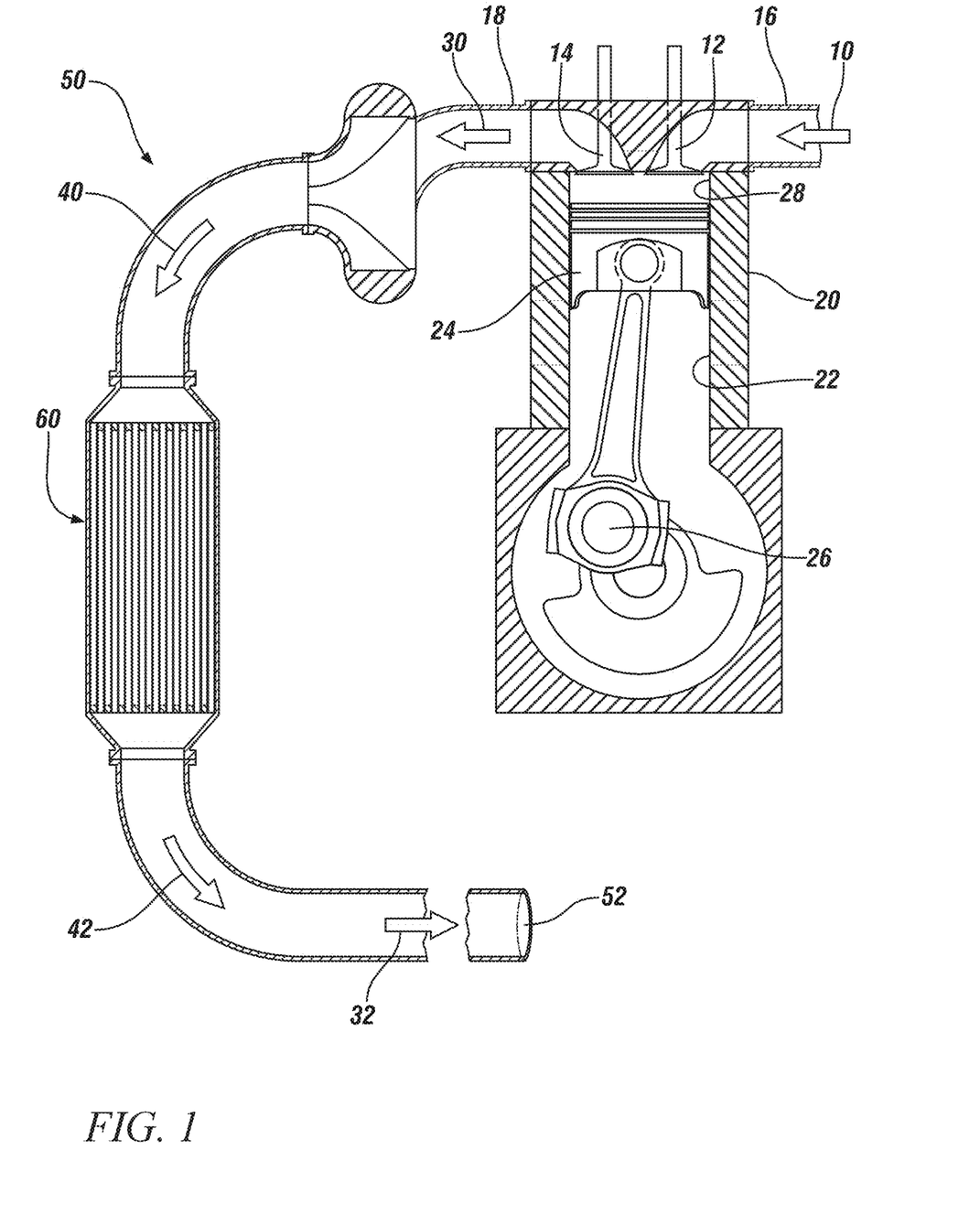
FIG. 1 illustrates an exhaust gas treatment system appurtenant to an internal combustion engine, according to one or more embodiments.

FIG. 1 illustrates a catalytic device 60 appurtenant to exhaust gas treatment system 50. System 50 is configured to receive and treat exhaust gas 30 generated by internal combustion engine (ICE) 20. Catalytic device 60 generally represents close-coupled catalytic devices, underfloor catalytic devices, and others as will be known by those of skill in the art. A mixture of air and fuel 10 enters ICE 20 and exits as an exhaust gas 30. The exhaust gas stream 40 then passes through the exhaust gas treatment system 50. In general, catalytic device 60 is configured to effect conversion (e.g., oxidation) of exhaust gas 30 constituents, including carbon monoxide (CO), hydrocarbons (HC), and one or more nitrogen oxide (NOx) species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

ICE 20 can be configured to power a vehicle (not shown). The multi-cylinder, reciprocating piston ICE 20 may be a charge compression ICE (i.e., diesel ICE) or a spark ignition direct injection ICE (i.e., gasoline ICE, which may or may not contain an in-cylinder fuel injector), for example. Each of these types of ICEs includes one or more cylinders 22 that accommodate reciprocating piston heads 24 connected to a crankshaft 26. Located above each piston head 24 is a combustion chamber 28 that receives a mixture of air and fuel 10 through an intake valve 12 at specifically timed intervals. The spark or compression assisted ignition of the air and fuel mixture 10 in the combustion chambers 28 invokes rapid downward linear movement of their respective piston heads 24 to drive rotation of the crankshaft 26. The reactive upward movement of each piston head 24 expels the combustion products from each combustion chamber 28 through an exhaust valve 14.

ICE 20 is supplied with a continuous air flow at a variable mass flow rate responsive to ICE performance demands (e.g., pressing and depressing a foot pedal located in the driver-side compartment to achieve desired vehicle speed and acceleration). A quantity of fuel is intermittently injected into an incoming air flow just upstream from the ICE 20, as dictated, for example, by an ICE control strategy, to produce a mixture of air and fuel that exhibits the instantly desired air to fuel mass ratio (not shown). For example, the quantity of fuel injected into the incoming air flow can be controlled to maintain a lean air-to-fuel mass ratio or a rich air-to-fuel mass ratio, or to switch between the two states.

The mixture of air and fuel 10 enters an intake manifold 16 of the ICE 20 and exits as an exhaust gas 30 through the exhaust manifold 18. The intake manifold 16 delivers the air and fuel mixture 10 into the combustion chambers 28 through the intake valve 12 and then to the cylinders 22 of the ICE 20. The air and fuel mixture 10 is compressed, heated, and thereby ignited to power the reciprocating piston heads 24 in the cylinders 22 of the ICE 20. The spent combustion products are expelled from the cylinders 22 of the ICE 20 by the exhaust strokes of the pistons 24 and into the exhaust manifold 18 through the exhaust valve 14. The exhaust manifold 18 delivers the combustion products to the exhaust gas treatment system 50 as the exhaust gas 30. The treatment system 50 communicates the exhaust gas 30 to catalytic device 60 for the effective conversion of exhaust gas 30 constituents (e.g., CO, HC, and $NO_x$).

Figure 2:
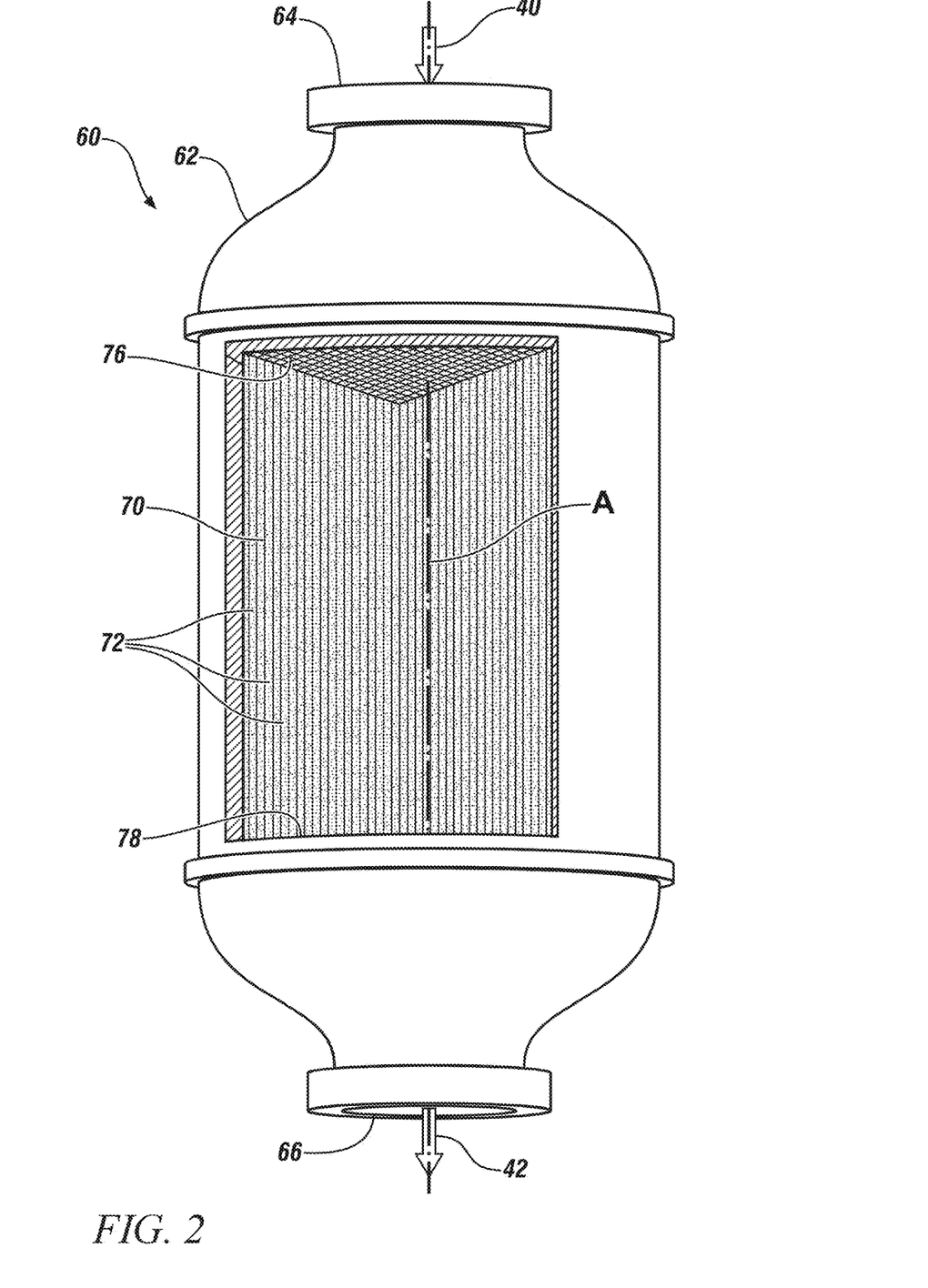
FIG. 2 illustrates an catalyst device, according to one or more embodiments.
Figure 3:
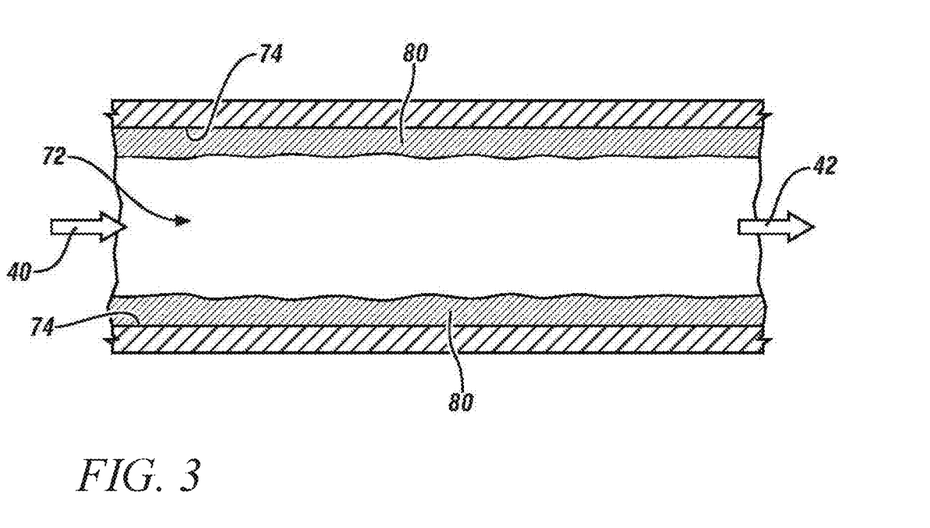
FIG. 3 illustrates a cross sectional view of an catalyst device, according to one or more embodiments.

As shown in FIGS. 1-3, the exhaust gas stream 40 enters catalytic device 60 and passes through the support body 70, which can comprise flow-through channels 72, for example, defined by walls 74. Catalytic device 60 (e.g., a three-way catalytic converter) comprises catalyst material disposed on the support body 70. Support body 70 is a generally porous, non-metal (i.e., a material which is not an elemental metal or metal alloy) material, such as a metal oxide or ceramic material. As will be described below, the support body 70 comprises theta-phase alumina. The high-surface area of the channel walls 74 creates sufficient contact between the exhaust gas 30 and the catalyst material for the desired reactions (e.g., oxidation and reduction reactions) to occur. The exhaust gas treatment system 50 then communicates the exhaust gas stream 40 from catalytic device 60 as a treated exhaust gas stream 42. The treated exhaust gas 32 is expelled from the treatment system 50 through a vent 52 (e.g., a vehicle tail pipe), for example to the ambient atmosphere.

A suitable catalytic device 60 for the catalyzed reactions disclosed herein is shown in FIG. 2, and is piped within the exhaust gas treatment system 50 to facilitate continuous passage of the exhaust gas stream 40 therethrough. Catalytic device 60 can further include a shell or canister 62 comprising a substantially inert material, relative to the exhaust gas constituents, such as stainless steel or other metal alloys. Canister 62 is shaped with an upstream inlet 64 for exhaust gas 30 entry, and a downstream outlet 66 for exhaust gas 30 expulsion. The body of the canister 62 can be round or elliptical in cross-section, although other configurations are practicable, and sized to hold a support body 70 to which catalyst material is applied. In FIG. 2, a wedge portion of the canister 62 and the catalyst-coated support body 70 have been cut-away to better reveal the internal channels 72 extending therethrough.

The support body 70 is shown in FIG. 2 as a honeycomb-shaped monolith with an inlet face 76 and an outlet face 78 transverse to the exhaust gas stream 40 (that is, along the flow axis A), and includes several small, parallel flow-through channels 72 defined by walls 74 which extending longitudinally from the inlet face 76 to the outlet face 78 of the support body. Since each channel 72 is small in cross-section for admitting the exhaust gas stream 40, the inlet face 76 of the support body is sized to provide a suitable number of channels 72 to collectively accommodate a desired flow rate for the exhaust gas stream 40 and sufficient contact between the exhaust gas 30 and the catalyst material. For example, the support body 70 may contain about four-hundred channels 72 per square inch of inlet face 76 cross-sectional area. While extruded ceramic, honeycomb-shaped monoliths have proven effective and durable for catalysts, other catalyst support bodies of different materials and geometric configurations may be used and are germane to the embodiments herein.

Figure 4:
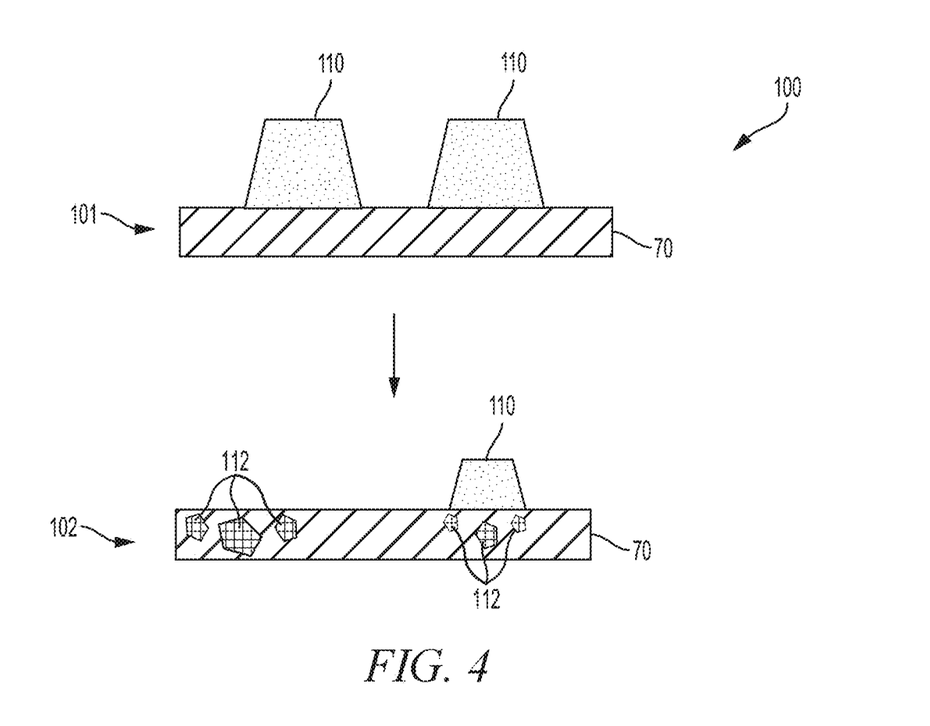
FIG. 4 illustrates a schematic of a lifecycle for a common catalyst system, according to one or more embodiments.

Catalyst material is generally disposed on support body 70. In a non-limiting example, as shown in FIG. 3, small particles of the catalyst material, depicted by layer 80, are deposited on the walls 74 of the flow-through channels 72 of support body 70. Typical catalyst systems suffer from migration, encapsulation, and deactivation of catalytic metals after prolonged use, at least in part due to the use and/or formation of alpha-phase alumina as a catalyst support material. FIG. 4 illustrates a lifecycle 100 (or a partial lifecycle) of a common catalyst system, wherein an unaged catalyst system 101 is provided and includes an alpha-phase alumina support 70 with catalytic metal 110 disposed thereon. An aged catalyst system 102 exhibits a large fraction of catalytic metal 112 encapsulated beneath the surface of the alpha-phase alumina support 70, leaving a diminished portion of the catalytic metal 110 available for catalytic activity.

Figure 5:
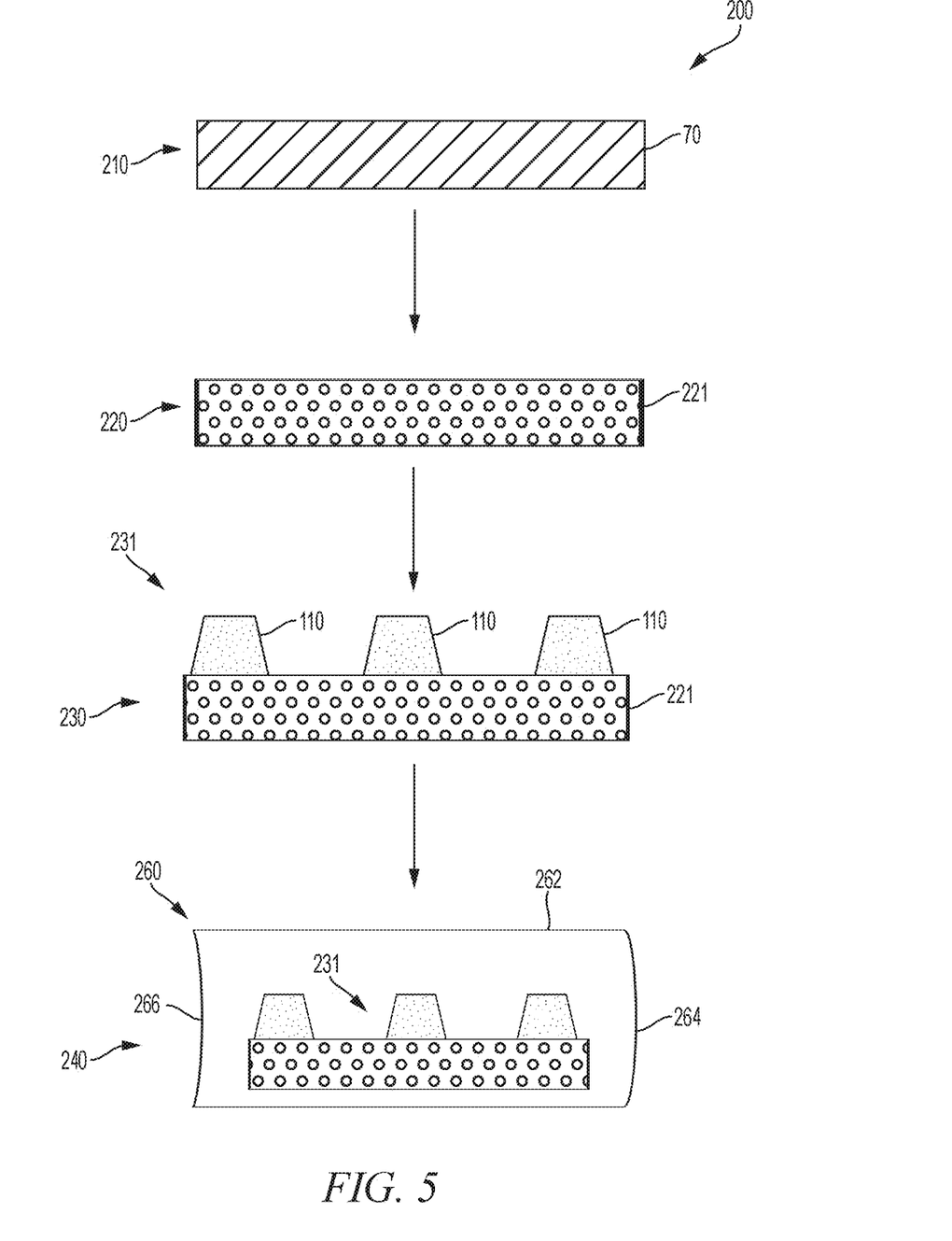
FIG. 5 illustrates a method for preparing a catalytic system, according to one or more embodiments.

Accordingly, provided herein are methods for preparing catalytic systems which improve the catalytic longevity of such systems. FIG. 5 illustrates a method 200 for preparing a catalytic system (e.g., catalytic device 60), comprising providing 210 a gamma-phase alumina support body 70, passivating 220 the gamma-phase alumina support body 70 to yield a theta-phase alumina support body 221, and applying 230 catalytic metal 110 to passivated theta-phase alumina support body 221 to form a catalytic body 231. Method 200 can further comprise disposing 240 to the catalytic body 231 within a shell 262 to form a catalytic device 260. The catalytic device can have an inlet and an outlet wherein exhaust gas can be received and expelled, respectively. The catalytic device 260 can comprise a three-way catalyst. Passivating 220 can include heating the gamma-phase alumina support body 70 to a temperature between about 700° C. to about 1,200° C., about 800° C. to about 1,100° C., or about 900° C. to about 1,000° C. Passivating 220 can include heating the gamma-phase alumina support body 70 in the presence of steam. Passivating 220 can include heating the gamma-phase alumina support body 70 from about 700° C. to about 1,200° C. with a ramping rate of less than about 10° C./minute. The ramping rate can be less than about 10° C./minute, less than about 7.5° C./minute, or less than about 5° C./minute. In some embodiments the ramping rate can be about 1° C./minute to about 5° C./minute. Slower ramping rates can be preferred in order to maintain a suitable amount of surface area in the theta-phase alumina support body 221 after passivation 220. Passivating 220 can include heating the gamma-phase alumina support body 70 within a temperature range of about 700° C. to about 1,200° C. for at least about 7.5 hours, at least about 10 hours, or at least about 15 hours.

In some embodiments, the gamma-phase alumina support body 70 can comprise lanthanum-doped gamma-phase alumina. For example, the gamma-phase alumina support body 70 can be about 0.1 wt. % to about 55 wt. %, about 0.5 wt. % to about 25 wt. %, or about 1 wt. % to about 5 wt. % lanthanum. In embodiments wherein the gamma-phase alumina support body 70 comprises lanthanum-doped gamma-phase alumina, passivating 220 can comprise heating the lanthanum-doped gamma-phase alumina support body 70 to a temperature between about 800° C. to about 1,300° C., about 900° C. to about 1,200° C., or about 1,000° C. to about 1,100° C.

The catalytic metal 110 can be applied to the passivated 220 theta-phase alumina support body 221 via impregnation or precipitation, for example. The catalytic metal 110 can comprise rhodium, copper, or nickel. In embodiments wherein the catalytic metal 110 is rhodium or nickel, the metal can be applied to the passivated theta-phase alumina support body 221 at a loading of about 0.1 wt. % to about 10 wt. %. A "loading" is the amount of catalytic metal relative to the total weight of the catalytic metal and the passivated theta-phase alumina support body 221 (e.g., 10 grams of rhodium applied to a 90 gram support is applied at a loading of 10%). In embodiments wherein the catalytic metal 110 is copper, the metal can be applied to the passivated theta-phase alumina support body 221 at a loading of about 0.1 wt. % to about 30 wt. %.

Gamma-phase alumina is ubiquitously used throughout all catalyst-germane industries because it is the alumina phase with the highest surface area and crystallinity. Accordingly, the gamma-phase alumina support body 70 (e.g., as provided by a supplier) is substantially gamma-phase alumina. For example, the gamma-phase alumina support body 70 can be at least about 80 wt. % gamma-phase, at least about 90 wt. % gamma-phase, or at least about 99 wt. % gamma-phase. After suitable passivation 220, the passivated theta-phase alumina support body 221 can be at least about 80 wt. % theta-phase, at least about 90 wt. % theta-phase, or at least about 99 wt. % theta-phase.

Example 1

Figure 6A:
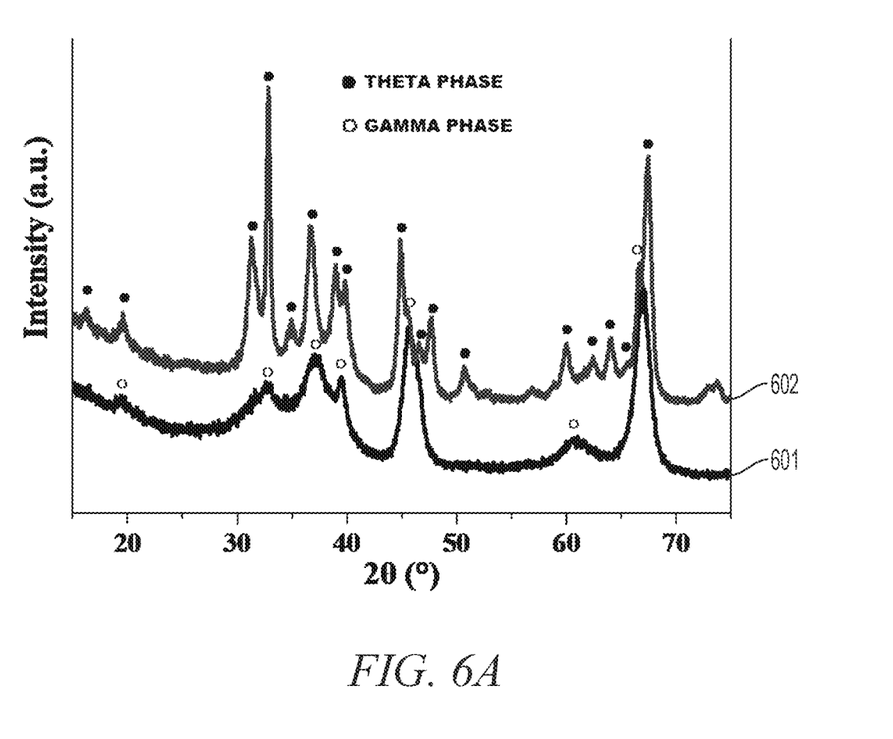
FIG. 6A illustrates X-ray diffraction patterns for an un-passivated support and a passivated support, according to one or more embodiments.

Two gamma-phase alumina supports were acquired. Each support pre-treated by heating to 550° C. in 10% relative humidity for 5 hours to yield supports with surface areas of 145 m$^2$/g. One support was passivated by heating at 950° C. in air with 10% humidity for 5 hours to yield a passivated support with a surface area of 91 m$^2$/g. FIG. 6A illustrates measured X-ray diffraction (XRD) patterns for the un-passivated support 601 and the passivated support 602. The un-passivated support 601 exhibited substantially all gamma-phase alumina and the passivated support 602 exhibited substantially all theta-phase alumina. Rhodium was applied to each of the supports at a 0.5 wt. % loading and the catalyst systems were hydrothermally aged at 1050° C. for 12 hours at 10% humidity.

Figure 6B:
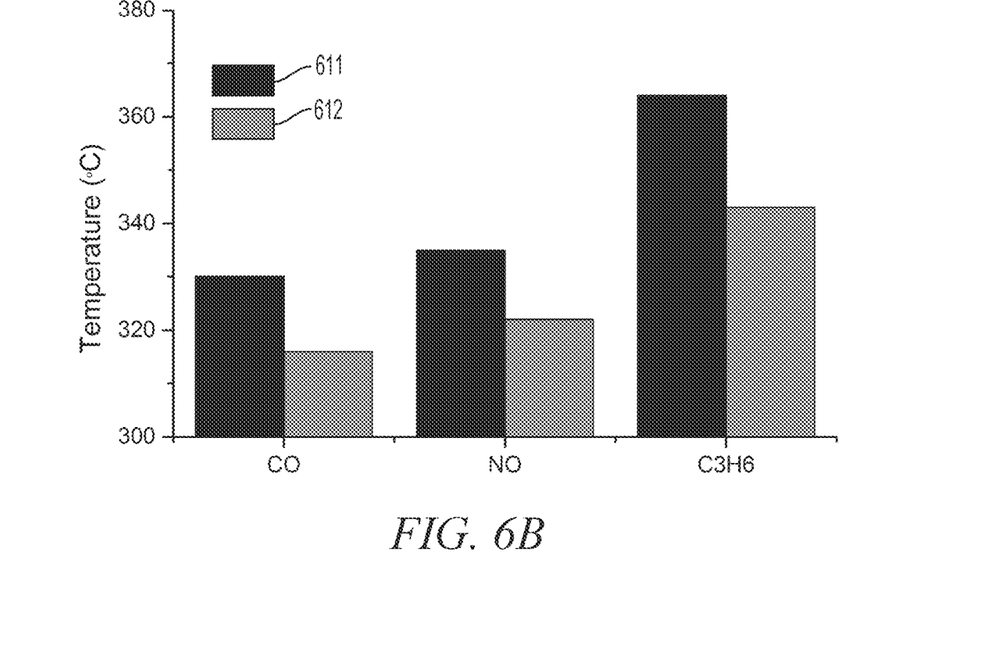
FIG. 6B illustrates a bar chart comparing light-off temperature data for two catalyst devices, according to one or more embodiments.

The gamma-phase catalyst system 611 and the theta-phase catalyst system 612 were exposed to a gas stream comprising 1% CO, 1000 ppm NO, 667 ppm $C_3H_6$, 333 ppm $C_3H_8$, 3% $H_2O$, 12% $CO_2$, 0.92% $O_2$, and the balance $N_2$. The gas was supplied at a flow rate of 1 L/min, with λ=1, GHSV=288 000 h$^{-1}$, and the temperature of the gas stream and the catalyst systems were gradually increased to measure conversion of species within the gas stream at varying temperatures. FIG. 6B illustrates the light-off temperatures (i.e., the temperature at which a catalyst converts 50% of a particular gaseous species) of the gamma-phase catalyst system 611 and the theta-phase catalyst system 612 for CO, NO, and $C_3H_6$. It can be seen that the theta-phase catalyst system 612 exhibits lower light-off temperatures for each of CO, NO, and $C_3H_6$, and, surprisingly, performs better than the gamma-phase catalyst system 611 despite the lower surface area of its theta-phase catalyst support 602 relative to the gamma-phase catalyst support 601.

Example 2

Figure 7A:
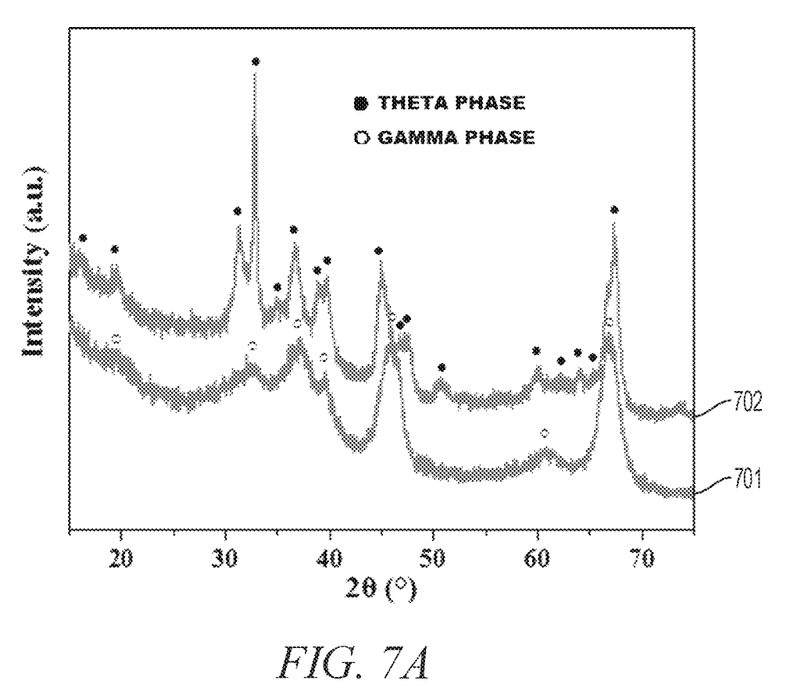
FIG. 7A illustrates X-ray diffraction patterns for an un-passivated support and a passivated support, according to one or more embodiments.

Two lanthanum-doped gamma-phase alumina supports were acquired with a lanthanum loading of about 4.5 wt. %. Each support pre-treated by heating to 550° C. in 10% relative humidity for 5 hours to yield supports with surface areas of 199 m$^2$/g. One support was passivated by heating at 1050° C. in air with 10% humidity for 5 hours to yield a passivated support with a surface area of 87 m$^2$/g. FIG. 7A illustrates measured XRD patterns for the un-passivated support 701 and the passivated support 702. The un-passivated support 701 exhibited substantially all gamma-phase alumina and the passivated support 702 exhibited substantially all theta-phase alumina. Rhodium was applied to each of the supports at a 0.5 wt. % loading and the catalyst systems were hydrothermally aged at 1050° C. for 12 hours at 10% humidity.

Figure 7B:
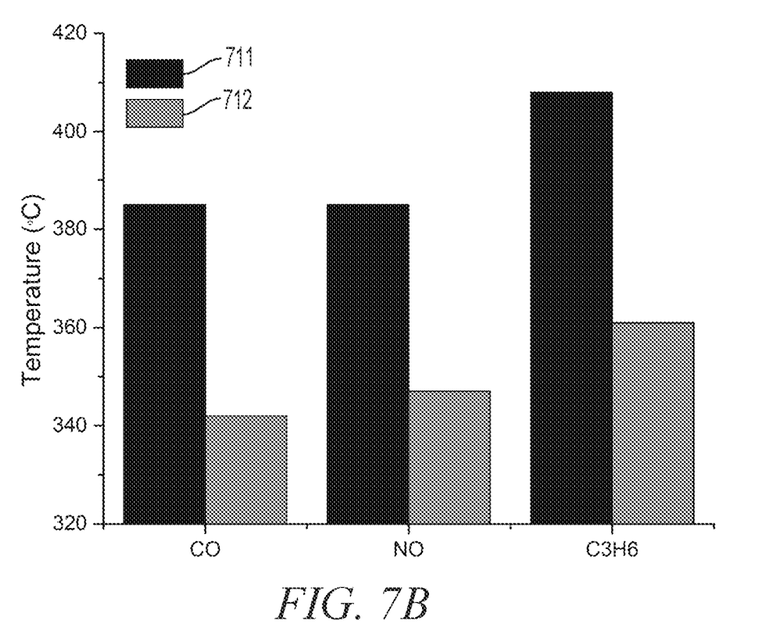
FIG. 7B illustrates a bar chart comparing light-off temperature data for two catalyst devices, according to one or more embodiments.

The gamma-phase catalyst system 711 and the theta-phase catalyst system 712 were exposed to a gas stream comprising 1% CO, 1000 ppm NO, 667 ppm $C_3H_6$, 333 ppm $C_3H_8$, 3% $H_2O$, 12% $CO_2$, 0.92% $O_2$, and the balance $N_2$. The gas was supplied at a flow rate of 1 L/min, with λ=1, GHSV=288 000 h$^{-1}$, and the temperature of the gas stream and the catalyst systems were gradually increased to measure conversion of species within the gas stream at varying temperatures. FIG. 7B illustrates the light-off temperatures (i.e., the temperature at which a catalyst converts 50% of a particular gaseous species) of the gamma-phase catalyst system 711 and the theta-phase catalyst system 712 for CO, NO, and $C_3H_6$. It can be seen that the theta-phase catalyst system 712 exhibits lower light-off temperatures for each of CO, NO, and $C_3H_6$, and, surprisingly, performs better than the gamma-phase catalyst system 711 despite the lower surface area of its theta-phase catalyst support 702 relative to the gamma-phase catalyst support 701.

The catalysts of the present invention have utility for applications other than the treatment of diesel or gasoline ICE exhaust and may be useful for oxidation of gaseous oxidizable components generally, such as the exhaust of compressed natural gas ICEs, ethanol-fueled ICEs, compressors, and gas turbines, among others.

The exhaust gas may be exposed to other devices or mechanical equipment, not expressly shown in FIG. 1, that may or may not help produce the treated exhaust gas stream 42. These devices include, for example, another oxidation catalyst, a three-way catalyst, a particulate filter, a selective catalytic reduction (SCR) catalyst device, an exhaust gas recirculation line, a turbocharger turbine, a muffler, and/or a resonator. Skilled artisans will undoubtedly know of and understand these and many other possible additional appurtenant devices. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for preparing a catalytic system, the method comprising:
   providing a gamma-phase alumina support body;
   passivating the gamma-phase alumina support body to yield a theta-phase alumina support body; and
   applying a catalytic metal including rhodium, copper, or nickel to the passivated theta-phase alumina support body.

2. The method of claim 1, wherein the catalytic metal is rhodium or nickel, and the catalytic metal is applied to the passivated theta-phase alumina support body at a loading of about 0.1 wt. % to about 10 wt. %.

3. The method of claim 1, wherein the catalytic metal is copper, and the catalytic metal is applied to the passivated theta-phase alumina support body at a loading of about 0.1 wt. % to about 30 wt. %.

4. The method of claim 1, wherein the gamma-phase alumina support body is at least about 90 wt. % gamma-phase alumina.

5. The method of claim 1, wherein the passivated theta-phase alumina support body is at least about 80 wt. % theta-phase alumina.

6. The method of claim 1, wherein passivating comprises heating the gamma-phase alumina support body to a temperature of about 700° C. to about 1,200° C.

7. The method of claim 6, wherein the gamma-phase alumina support body is heated in the presence of steam.

8. The method of claim 1, wherein passivating comprises heating the gamma-phase alumina support body from about 700° C. to about 1,200° C. with a ramping rate of less than about 10° C./minute.

9. The method of claim 1, wherein passivating comprises heating the gamma-phase alumina support body within a temperature range of about 700° C. to about 1,200° C. for at least about 7.5 hours.

10. The method of claim 1, wherein the gamma-phase alumina support body comprises lanthanum-doped gamma-phase alumina.

11. The method of claim 10, wherein the gamma-phase alumina support body is about 0.1 wt. % to about 55 wt. % lanthanum.

12. The method of claim 10, wherein passivating comprises heating the lanthanum-doped gamma-phase alumina support body to a temperature of about 800° C. to about 1,300° C.

13. The method of claim 1, wherein the catalytic metal is applied to the passivated theta-phase alumina support body via impregnation.

14. The method of claim 1, wherein the catalytic metal is applied to the passivated theta-phase alumina support body via precipitation.

15. A method for preparing a three-way catalytic system, the method comprising:
   providing a gamma-phase alumina support body;
   passivating the gamma-phase alumina support body to yield a theta-phase alumina support body;
   applying a catalytic metal including rhodium, copper, or nickel to the passivated theta-phase alumina support body to form a catalytic body; and
   disposing the catalytic body within a canister having an inlet and an outlet.

16. The method of claim 15, wherein the gamma-phase alumina support body is at least about 90 wt. % gamma-phase alumina and the passivated theta-phase alumina support body is at least about 80 wt. % theta-phase alumina.

17. The method of claim 15, wherein the catalytic metal is rhodium or nickel, and the catalytic metal is applied to the passivated theta-phase alumina support body at a loading of about 0.1 wt. % to about 10 wt. %.

18. The method of claim 15, wherein the catalytic metal is copper, and the catalytic metal is applied to the passivated theta-phase alumina support body at a loading of about 0.1 wt. % to about 30 wt. %.

19. The method of claim 15, wherein the gamma-phase alumina support body comprises lanthanum-doped gamma-phase alumina, and the gamma-phase alumina support body is about 0.1 wt. % to about 55 wt. % lanthanum.

* * * * *